Aug. 9, 1932.　　　　D. H. KILLEFFER　　　　1,870,684
HEAT EXCHANGE METHOD AND APPARATUS
Filed Nov. 30, 1929　　　2 Sheets-Sheet 1
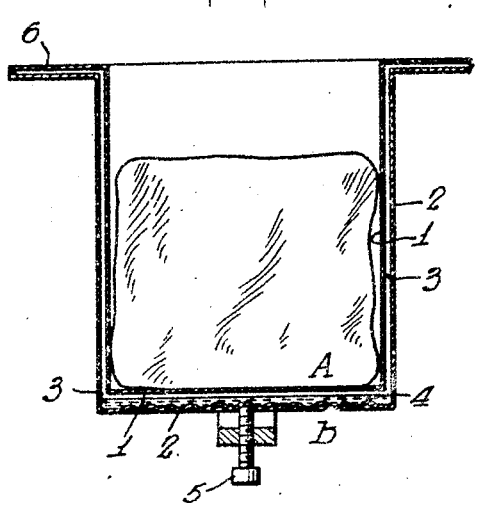
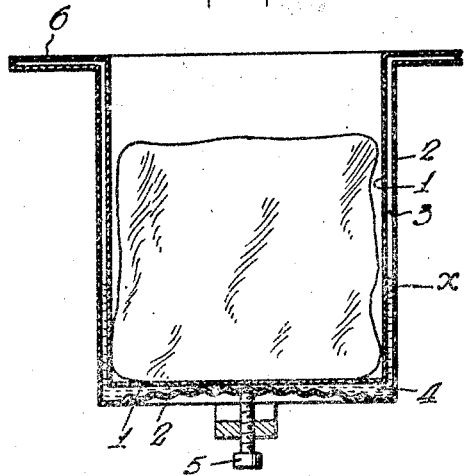
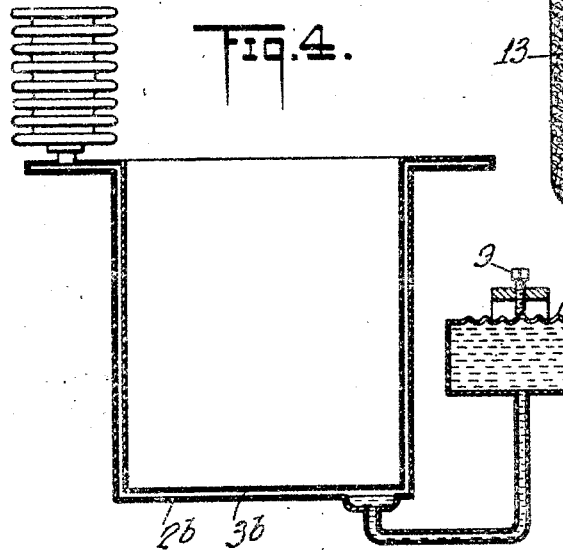
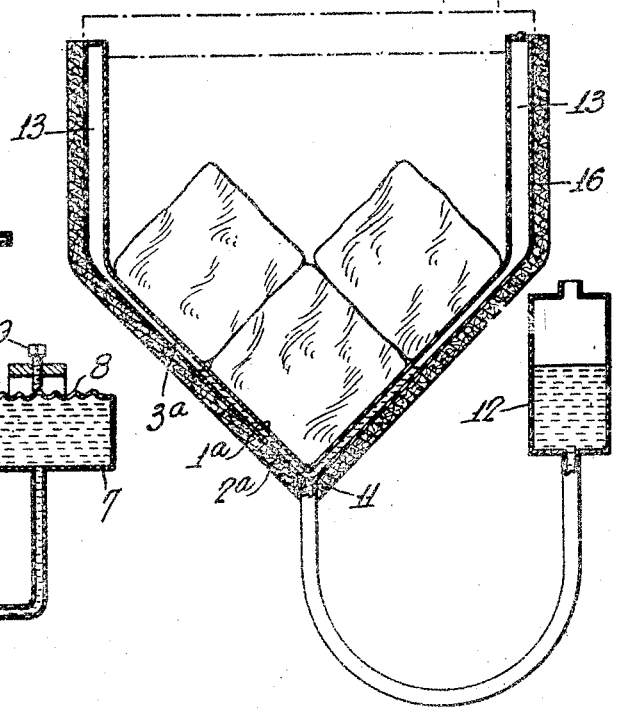
INVENTOR
David H. Killeffer
BY
George C. Bean
ATTORNEY

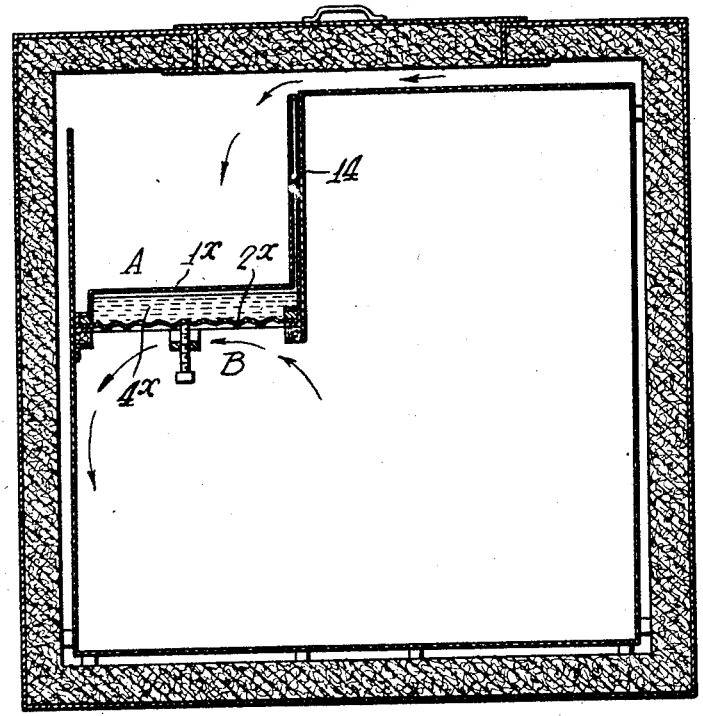
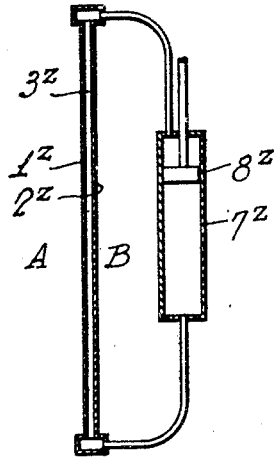
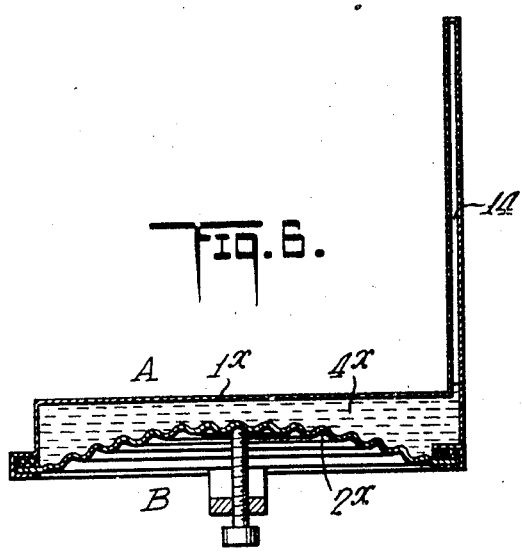

Patented Aug. 9, 1932

1,870,684

UNITED STATES PATENT OFFICE

DAVID H. KILLEFFER, OF YONKERS, NEW YORK, ASSIGNOR TO DRYICE EQUIPMENT CORPORATION, OF NEW YORK, N. Y., A CORPORATION OF DELAWARE

HEAT EXCHANGE METHOD AND APPARATUS

Application filed November 30, 1929. Serial No. 410,749.

My present invention was primarily devised as a solution of certain problems connected with controlling the rate of melting of solid carbon dioxide by varying the rate of heat transfer thereto, but the principles involved may be applied in any relation where it is desired to vary the rate of heat exchange between any materials or gases of different temperatures, as for instance, varying the rate of cooling of hot water by cool air, or the like.

More specifically considered, the invention involves varying the conductivity of a wall separating the two materials or gases of different temperatures, by interposing or removing differently conducting fluid media between the heat receiving and the heat delivering surfaces of said wall. This requires double walls affording an interspace for the fluids.

More specifically considered, the invention involves the employment of a gas as the slowly conducting or heat insulating fluid and a liquid as the more rapidly conducting fluid to be substituted therefor when a higher rate of heat transfer is desired.

A special case of maximum alternating, conducting and non-conducting effects would be where mercury is the liquid, displacing an attenuated gas or approximate vacuum, but while these may prove practical for certain uses, they are expensive. For ordinary uses any gas, including air at atmospheric pressure, will be found to interpose an insulating effect which is very great as compared with ordinary liquid such as water, gasolene, ether, or the like, which may be used as the high conducting fluid for displacing the air or other gas. In practice, it will be found that the transition resistances between gases and solids, plus the relatively minute heat carrying capacity of the air or other gas, entitles the latter to be classed as non-conductors as compared with liquids which naturally have much lower transition resistances and enormously greater heat carrying capacity.

The thinner the film of the liquid that is required to fill the interspace between the walls, the higher will be the conductivity afforded thereby and the thicker the layer of gas, the better the insulation afforded thereby. However, as indicated above, any interposed layer of gas, no matter how thin, is of almost negligible conductivity as compared with liquid even though the layer of the latter be very thick; and the respective thicknesses to be selected will depend on the conditions of use.

In the particular case of regulating heat transfer to evaporate solid carbon dioxide and, doubtless for many other uses, it is entirely practical to have the liquid, as for instance gasolene, alcohol, ether, etc., continuously present in the interspace between the double walls, the variation of conductivity being accomplished merely by flexing the outer wall or otherwise forcing liquid to displace the gas. In practice in the above relation such an arrangement gives a very abrupt change of heat conductivity in case the wall is a horizontal one and liquid contact is made over the entire area of the wall simultaneously. Graduated effects may be obtained, however, where the surface to be contacted by the liquid is inclined so that the amount of interspace filled by the liquid increases gradually instead of abruptly. While the graduated contact area may be desirable in some cases, practical experience has shown that abrupt, large-area contact, giving what may be called a contact "make and break" effect can be thermostatically controlled from the refrigerated space refrigerated thereby, so as to produce extremely close temperature regulation.

Where my method is applied for control of intense refrigerants to produce moderate temperatures, the refrigerant may be protected by any desired amount of fixed insulating covering to establish a relatively slow rate of transfer yielding relatively high refrigerator temperatures, as for instance, 25° to 40° or 50° above zero, my method being used merely to control and take care of variations within the natural limits imposed by the fixed insulation.

The above and other features of my invention will be more evident from the following description in connection with the accompanying drawings, in which Figs. 1 and 2 are vertical sections, more or less diagrammatic, illustrating a simple embodiment of my invention;

Fig. 3 is a similar view showing a modification;

Fig. 4 is a similar view of a further modification;

Fig. 5 is a similar view showing a modified arrangement for applying the invention to a refrigerator;

Fig. 6 is a similar view showing a detail of the variable heat transfer element of Fig. 5; and Fig. 7 is a similar view of a modification.

In Figs. 1 and 2, walls 1 and 2 with interspace 3, form a wall or septum that separates a space A containing materials or gases of one temperature from a space B containing materials or gases of a different temperature. In the form shown, these walls constitute the bottom of a double walled vessel having A as its interior and B as its exterior, but so far as concerns the broad invention, the means whereby region A is maintained at a different temperature from region B is unimportant. In the form shown, one of the surfaces 2 is flexible, in this case corrugated, so that it can be forced upward to greatly reduce the interspace 3. In the position of the parts shown in Fig. 1, the interspace 3 contains a good conducting material, specifically, a body of liquid 4 that is separated from the wall 1 by an interspace containing air or other gas. In this case, the wall 1 being perfectly horizontal, the upper level of liquid 4 will lie parallel with and may be very close to wall 1, thereby making it possible to have a relatively thin intervening layer of less-conducting material, in this case, gas or air. When the lower wall 2 is deflected upward, the liquid forces out the gas layer and comes in contact with 1 over its entire area, thus substituting a good conductor for a very poor conductor and greatly increasing the rate of heat transfer between A and B. Further flexing will force liquid upward between the side walls as indicated at $x$ and, if the parts are properly proportioned to that end, these walls may also be filled with liquid, entirely displacing the air.

The displaced air may be taken care of by compression or by springing of the walls when they are flat or by being allowed to flow in and out through a breather hole 6; or, a clearance reservoir may be provided as illustrated in Figs. 4, 5 and 6.

The hand, or thermostatic means may be employed for flexing the diaphragm 2, a screw 5 being diagrammatically indicated as representative of such means.

In the arrangement of Fig. 1, it will be noted that between the region A and region B is interposed heat conducting resistance of wall 1, gas layer, intervening liquid layer 3, and wall 2.

In Fig. 4 an arrangement is shown wherein the wall $2b$ is not flexible and the liquid may be completely withdrawn from the interspace $3b$. Such withdrawal permits the entire space $3b$ to be filled with gas when minimum heat conductivity is desired; it permits the interspace to be made thinner so that less liquid is required to fill it.

In Fig. 4 the liquid is introduced from and withdrawn to an exterior reservoir 7 provided with forcing means diagrammatically indicated as comprising the flexible diaphragm 8 operated by mechanical means, such as screw 9 or thermostatic control means of any known or desired kind.

Withdrawal of all the liquid has the further advantage that the bottom of the vessel may be slanting instead of horizontal, this also making it more practical to have a thin interspace without any liquid contact when the liquid is in the withdrawn position.

This principle of withdrawal of the liquid from the interspace may be utilized to secure an adjustable or graduated area of liquid contact, from no contact up to complete filling of the interspace. While this principle may be availed of by slightly inclining the bottom 1 of Figs. 1 and 2, a cleaner operation and more accurate graduation may be attained in the apparatus shown in Fig. 3. In this figure, both inner and outer walls of the bottom of the vessel are shown as V-shaped, preferably with a right angle apex so as to accommodate rectangular blocks of solid carbon dioxide, but the angle of convergence may be much greater or less than a right angle. The steeper the angle, the wider will be the permissible range of liquid level adjustment to secure a desired area of liquid contact. As shown in Fig. 3, the bottom walls $1a$, $2a$ afford the interspace $3a$ which drains to the outlet 11. The influx and withdrawal of the liquid may be effected by means such as shown in the other figures, or by means of a vertically adjustable reservoir 12. The liquid in space $3a$ will arise to precisely the level of the liquid in 12 and if the latter is transparent, this level will be obvious to the eye. Fig. 3 shows vertical walls affording a large air space 13 so that a vent is unnecessary.

In Figs. 5 and 6, I have shown a self contained unit to be interposed between regions A and B containing gases or materials of different temperatures. It consists of a wall member $1x$, forming the upper surface of a receptacle containing liquid $4x$ supported by a flexible diaphragm $2x$. In the position shown in Fig. 5, the liquid is out of contact with $1x$, whereas in Fig. 6 the bottom diaphragm $2x$ has been flexed upward to displace the air into an upward extension 14.

As shown, this unit is arranged to form the bottom of a solid carbon dioxide bunker constituting region A in a refrigerator, the solid carbon dioxide resting upon 1x and the diaphragm 2x being in contact with the air in the refrigerator which corresponds to region B of the other figures.

In this arrangement the refrigerator will be at relatively high temperatures, somewhat above freezing, while region A will be at the temperature of the evaporating refrigerant. Consequently, there will always be considerable heat transfer, but the enormous difference of transfer rate which results when the gaseous layer is eliminated, as shown in Fig. 6, will be completely controlling.

In this connection, it is to be noted that in all cases where intense refrigerants are used to produce moderate temperatures, any desired amount of general insulation may be provided to predetermine a high temperature level within which regulation may be secured in accordance with my invention. In Fig. 3, the insulation 16 is employed for this purpose and it will be evident that its thickness, and whether it is used or not, will be determined by the conditions and temperature differences which are to be controlled.

In Fig. 7 I have shown a further modification in which the walls 1z, 2z, with interspace 3z separate a region or material A of one temperature from another B of a different temperature.

In this case, the air or gas and the liquid to be interposed in and expelled from the space 3z are both taken care of by a single source of supply shown as a pump-like cylinder 7z, having a piston 8z, accommodating the liquid on one side of the piston and the gas on the other side of the piston. This piston may be operated by a thermostat either directly or through a servo motor; or it may be operated by hand.

The position of the double wall may be vertical or inclined, in which case the conductivity may be varied progressively after the manner described in connection with Fig. 3; or it may be horizontal, giving a make and break effect similar to that described in connection with Figs. 1 and 4. In the latter case, the source of supply of liquid to be interposed or withdrawn may be at a higher level or the connections may be arranged so that there will be no danger that the liquid will drain through the interspace into the gas space and vice versa.

In the foregoing I have described the liquid as adapted to expel gas from the interspace in the double-wall septum, the gases and liquids selected being such that the gas has little or no tendency to absorption in the liquid, but the broad principle of interposing liquid and gas alternately is independent of where the gas comes from or goes to; and I have discovered that it is possible to have the gas become absorbed in the liquid within the interspace instead of being displaced therefrom. While this method of interposing liquid is covered by the broad claims hereof, it involves change of vapor pressure either mechanically or by temperature change. The latter tends to render the apparatus thermostatically responsive but this does not preclude purely mechanical forcing of the liquid and gas regardless of vapor pressures in accordance with the specific part of my present disclosure and claims.

I have discovered that the change of vapor pressure and resulting absorption and evolution of gas, in response to temperature change may be utilized to cause mechanical movement of the liquid for the above purposes and also for more general thermostatic purposes, as set forth and claimed in my companion applications, Ser. No. 412,749 and Ser. No. 412,750 respectively.

I claim:—

1. A method of refrigerating a space by transferring heat therefrom at widely varying rates, which includes sublimating solid carbon dioxide by absorbing heat through spaced apart thin metal elements, one of which is in contact with said solid and the other of which is in contact with a region or material from which the heat is to be absorbed, interposing a layer or gas and a layer of liquid of lower freezing point than said solid between said metal elements for gas and liquid convection transfer of heat under normal conditions, and displacing said gas by the liquid when a lower refrigerating temperature is desired.

2. A method of refrigerating a space or products by transferring heat therefrom at varying rates, which includes sublimating solid carbon dioxide by absorbing heat through spaced apart thin metal elements, one of which is in contact with said solid and the other of which is in contact with a region or material from which the heat is absorbed, interposing a gas between said metal elements for convection transfer of heat at a relatively slow rate suitable for certain conditions, and displacing said gas by liquid of lower freezing point than said solid when a lower refrigerating temperature is desired.

3. Refrigerating apparatus, including a container having a double bottom comprising closely adjacent thin metal elements separated by a small volume interspace, the interior metal element supporting solid carbon dioxide on its upper surface, and having its lower surface approximately horizontal; and the exterior member being exposed to atmosphere within the refrigerated space; a body of liquid of lower freezing point than said solid and means for raising and lowering the level of the upper surface of said liquid to interpose it as a heat conducting medium in contact with both said surfaces.

4. Refrigerating apparatus, including a container having a double bottom comprising closely adjacent thin metal elements separated by a small volume interspace, the interior metal element supporting solid carbon dioxide on its upper surface, and the exterior member being exposed to atmosphere within the refrigerated space; a body of liquid of lower freezing point than said solid and means for raising and lowering the level of the upper surface of said liquid to interpose it as a heat conducting medium in contact with both said surfaces.

5. Refrigerating apparatus, including a container having a double bottom comprising closely adjacent thin metal elements separated by a small volume interspace, the interior metal element supporting solid carbon dioxide on its upper surface, and the exterior member being exposed to atmosphere within the refrigerated space; and means for interposing either liquid or gas as a heat transfer medium between the adjacent surfaces of said interspace.

6. Refrigerating apparatus, including a container having a double bottom comprising closely adjacent thin metal elements separated by a small volume interspace, the interior metal element supporting solid carbon dioxide on its upper surface, and having its lower surface approximately horizontal; and the exterior member being exposed to atmosphere within the refrigerated space; and means for interposing either liquid or gas as a heat transfer medium between the adjacent surfaces of said interspace.

Signed at New York in the county of New York and State of New York, this 27th day of November, A. D. 1929.

DAVID H. KILLEFFER.